April 21, 1936. N. MILLER 2,038,121
MEANS FOR MOUNTING BEARINGS ON SHAFTS
Filed Dec. 4, 1934
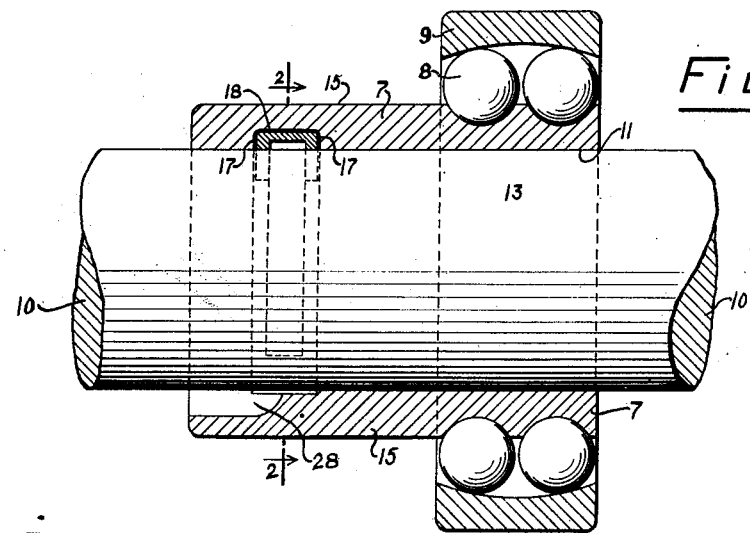
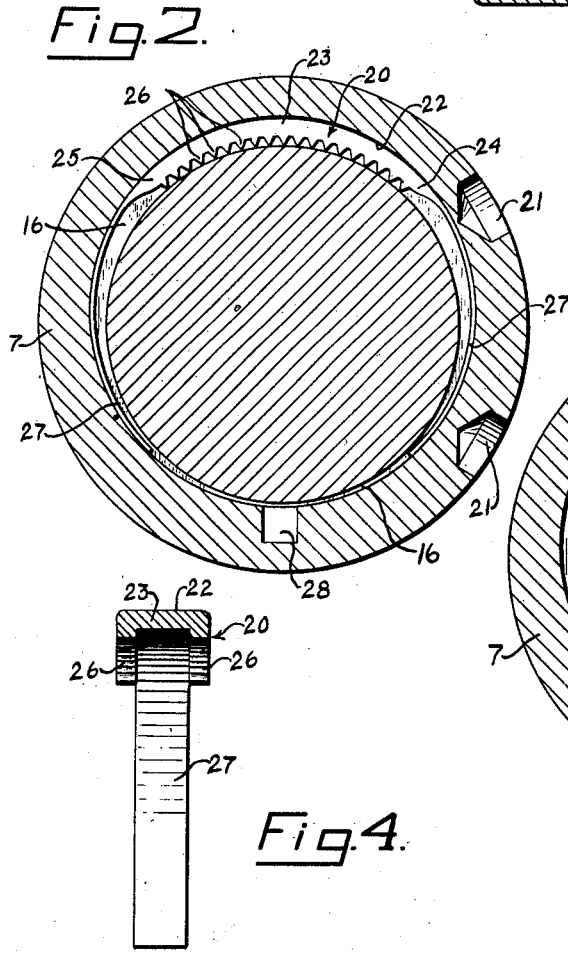
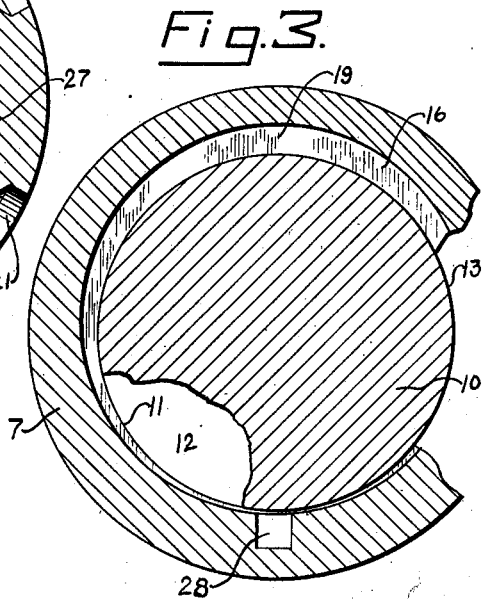
INVENTOR Patented Apr. 21, 1936

2,038,121

UNITED STATES PATENT OFFICE 2,038,121

MEANS FOR MOUNTING BEARINGS ON SHAFTS

Nils Miller, Atlanta, Ga., assignor to S K F Industries, Inc., Philadelphia, Pa., a corporation of Delaware Application December 4, 1934, Serial No. 755,897

5 Claims. (Cl. 287—52.09)

This invention relates to means for mounting a machine part on a shaft particularly for mounting the inner member of a bearing, as for instance an inner ring of an anti-friction bearing, on a shaft; and has for an object to provide efficient means which may be made a part of a self contained handling unit which may be readily mounted upon the shaft, and either by positive movement relative to the shaft be locked thereon, or the parts may be permitted to rotate after being brought to their proper positions whereupon the locking is automatically effected. Another object of the invention is to provide a locking device which may be readily unlocked for the purpose of removing the bearing or adjusting it upon the shaft.

In the drawing accompanying this specification, one, practicable application of my invention is illustrated in which drawing Figure 1 is a view partly in side elevation and partly in longitudinal section of a form of my invention mounted upon a broken away portion of the shaft.

Figure 2 is a cross section at about the plane of the line 2—2 of Figure 1 to show the eccentricity of the groove in relation to the bore of the inner ring of the bearing and to show the location of the locking shoe and of the spring keeper formed as a tail on the shoe.

Figure 3 is a view somewhat similar to Figure 2, the locking shoe being omitted, and Figure 4 is a detail view of the locking shoe.

The inner ring of a bearing is indicated by the character 7, the other parts of the bearing being indicated in a general way by 8 and 9. The ring 7 is shown mounted upon a shaft 10. The wall or face 11 of the bore 12 of the inner ring 7 of the bearing is intended to have a nice working fit with the outer perimeter or surface 13 of the shaft.

The inner ring of the bearing illustrated has an extension 15 at one end, or there may be an extension at each end if desired. Near the outer end of this extension there is formed in the bore a groove 16 preferably having radially disposed sides 17, the bottom 18 of the groove being formed eccentric in relation to the wall of the bore.

A locking shoe 20 is shown located within the groove and of such form and dimensions that it may readily move into the deeper portion 19 of the groove, and in such position that upon relative angular movement of the parts the shoe will be jammed between the perimeter of the shaft and the bottom of the groove.

The relative angular movement of the parts may be effected during the working operation of the parts or locking may be augmented by positively moving the shaft relative to the inner ring of the bearing. This may be accomplished in several ways, for instance, the extended portion of the bearing is shown provided with spanner holes 21.

The locking shoe 20 is shown formed on its outer and inner surfaces as a short segment of an eccentric ring, the segment being taken at the thickest portion of the ring whereby its outer surface 22 slopes from the center portion 23 toward both ends 24 and 25. This formation permits the shoe to be mounted indiscriminately in the groove and it also permits a greater amount of security in locking without danger of crushing or injuring the parts because of the fact that a thin end of the shoe will enter into the thin end of the space between the perimeter of the shaft and the bottom 18 of the eccentric groove 16 irrespective of the direction in which the shaft is rotating in relation to the bearing.

The inner or shaft engaging face 25 of the shoe may be roughened to augment its frictional engagement with the shaft and permit whatever sliding takes place to be between the groove and the shoe. In the illustration I have shown teeth 26 formed on the shaft engaging face of the shoe.

For holding the shoe in the groove for purposes of handling and assembly, I have illustrated the shoe as being extended at the respective ends into tails 27 serving as keeper springs, which are of sufficient length that, by their tendency to expand, they keep the shoe in the groove. This keeper spring and the body structure of the shoe should occupy about three-quarters of a circle when located in position in the groove.

For certain classes of work it will be found advantageous to cut a groove 28 from the end of the bearing ring into the shallowest portion of the groove 16. This serves two purposes, the operator in mounting the bearing on a shaft can by means of a suitable feeler, make sure that the shoe 20 is in approximately the deepest portion of the groove. Then when it is desired to dismount the bearing from the shaft, a feeler or key member may be slid into the groove 28 and caused to press upon one of the tails 27 and facilitate loosening it. The key may also be used when the bearing is off the shaft for raising one of the tails out of the groove and into such a position that the shoe structure may be entirely sprung out of the groove.

For the purpose of illustrating my invention one form has been shown and described which form at the present time is the preferred form. It will however, be understood that changes may be made within the scope of the claims without departing from the spirit of the invention.

Having thus described my invention, I claim and desire to secure by Letters Patent:

1. A member having a bore and a groove formed in the bore having its bottom eccentric to the wall of the bore, and a locking shoe located in the groove and of such radial dimensions that it may be moved into the deepest portion of the groove clear of the bore for the ready insertion of a shaft therein and upon relative angular movement of the parts, may be passed into narrower or shallower portions of the groove and extend beyond the wall of the bore whereby it will lockingly engage the perimeter of the shaft, and keeper spring means associated with the shoe for retaining it in the groove.

2. A member having a bore and a groove formed in the bore having its bottom eccentric to the wall of the bore, and a locking shoe located in the groove and of such radial dimensions that it may be moved into the deepest portion of the groove clear of the bore for the ready insertion of a shaft therein and upon relative angular movement of the parts, may be passed into narrower or shallower portions of the groove and extend beyond the wall of the bore whereby it will lockingly engage the perimeter of the shaft, and outwardly expanding keeper-spring means formed as a tail to the shoe for retaining it in the groove.

3. A member having a bore and a groove formed in the bore having its bottom eccentric to the wall of the bore, and a locking shoe located in the groove and of such radial dimensions that it may be moved into the deepest portion of the groove clear of the bore for the ready insertion of a shaft therein and upon relative angular movement of the parts, may be passed into narrower or shallower portions of the groove and extend beyond the wall of the bore whereby it will lockingly engage the perimeter of the shaft, and outwardly expanding keeper-spring means formed as tails at the respective ends of the shoe for retaining it in the groove.

4. A member having a bore and a groove formed in the bore having its bottom eccentric to the wall of the bore, and a locking shoe formed on its outer and inner surfaces as a short segment of an eccentric ring the segment being taken at the thickest portion of the ring, the shoe located in the groove and of such radial dimensions that it may be moved into the deepest portion of the groove clear of the bore for the ready insertion of a shaft therein and upon relative angular movement of the parts, may be passed into narrower or shallower portion of the groove and extend beyond the wall of the bore whereby it will lockingly engage the perimeter of the shaft, and outwardly expanding keeper-spring means formed as tails at the respective ends of the shoe for retaining it in the groove.

5. A member having a bore and a groove formed in the bore having its bottom eccentric to the wall of the bore, and a locking shoe located in the groove and of such radial dimensions that it may be moved into the deepest portion of the groove clear of the bore for the ready insertion of a shaft therein and upon relative angular movement of the parts, may be passed into narrower or shallower portions of the groove and extend beyond the wall of the bore whereby it will lockingly engage the perimeter of the shaft, and outwardly expanding keeper-spring means formed as tails extending substantially equal distances at the respective ends of the shoe for retaining it in the groove, and a slot extending from the end of member into the groove at its shallowest portion.

NILS MILLER.